United States Patent [19]
Poirier

[11] Patent Number: 5,574,278
[45] Date of Patent: Nov. 12, 1996

[54] ATOMIC FORCE MICROSCOPE USING PIEZOELECTRIC DETECTION

[75] Inventor: Gregory E. Poirier, North Potomac, Md.

[73] Assignee: The United States of America as represented by the Secretary of Commerce, Washington, D.C.

[21] Appl. No.: 448,316

[22] Filed: May 23, 1995

[51] Int. Cl.[6] .................................................. H01J 37/26
[52] U.S. Cl. ........................................ 250/306; 250/307
[58] Field of Search .................................. 250/306, 307; 73/105

[56] References Cited

U.S. PATENT DOCUMENTS

| | | | |
|---|---|---|---|
| 4,724,318 | 2/1988 | Binnig | 250/306 |
| 4,851,671 | 7/1989 | Pohl | 750/306 |
| 5,128,544 | 7/1992 | Iwatsuki | 250/306 |
| 5,172,002 | 12/1992 | Marshall | 250/561 |
| 5,173,605 | 12/1992 | Hayes et al. | 250/306 |
| 5,193,383 | 3/1993 | Burnham et al. | 250/307 |
| 5,196,701 | 3/1993 | Foster et al. | 250/307 |
| 5,196,713 | 3/1993 | Marshall | 250/561 |
| 5,198,715 | 3/1993 | Elings et al. | 310/328 |
| 5,210,410 | 5/1993 | Barrett | 250/234 |
| 5,237,859 | 8/1993 | Elings et al. | 73/105 |
| 5,254,854 | 10/1993 | Betzig | 250/234 |
| 5,267,471 | 12/1993 | Abraham et al. | 250/307 |
| 5,321,685 | 6/1994 | Nose et al. | 369/126 |
| 5,431,055 | 7/1995 | Takata et al. | 250/307 |

FOREIGN PATENT DOCUMENTS 383323 8/1990 European Pat. Off. .

Primary Examiner—Jack I. Berman
Assistant Examiner—Kiet T. Nguyen
Attorney, Agent, or Firm—Oliff & Berridge

[57] ABSTRACT

A method and apparatus detects surface properties of a sample surface using an atomic force microscope. The atomic force microscope includes a piezoelectric tube mounted on a rigid surface and separated into actuator and sensor segments. The sensor segments detect interatomic force information without snap-in effects common with cantilever mounts. A probe tip is mounted on the sensor section of the piezoelectric tube. The probe tip interacts with the interatomic forces of the sample surface. Supporting circuitry is used in either current feedback or force feedback modes.

26 Claims, 4 Drawing Sheets

ATOMIC FORCE MICROSCOPE USING PIEZOELECTRIC DETECTION

BACKGROUND OF THE INVENTION

1. Field of the Invention

The present invention relates to an atomic force microscope and more particularly to an atomic force microscope for determining surface properties of insulator and conductor samples, absent snap-in related errors.

2. Description of the Related Art

The atomic force microscope (AFM) is a derivative product of the original scanning tunnelling microscope (STM). Like the STM, the AFM comprises a sharp probe tip held in close proximity to a sample surface. The probe tip is scanned in X, Y, and Z directions with respect to the sample surface. STM and AFM belong to the general class known as proximal probe microscopes (PPMs). These microscopes can be used to determine sample surface properties including topology, atomic force, drag force, magnetic domain structure and electron density. Some realizations of PPM's are capable of imaging individual surface atoms. Unlike the STM, AFM's are not hindered by electrically insulating samples.

Conventional AFM's operate by analyzing the physical movement of the probe tip using a laser reflectance technique. The probe tip is sensitive to and moves as a result of atomic force interactions with the sample surface. The physical movements of the probe tip are directly related and therefore indicative of sample surface atomic properties. Interatomic forces result from chemical bonding between atoms in a given substance.

For conducting samples the probe tip may be used to detect current indicative of the sample's electrical properties. By using appropriate sensing and electronic feedback circuitry, a PPM may be used in either atomic force or electron tunneling modes. Conceptually, a feedback unit, as known in the art, is connected to the output of an amplification device of the probe tip signal. The feedback unit delivers an error signal proportional to the difference between the output signal and a reference signal, into an actuator sensed by the amplification device. By this process, the circuit provides self-correcting amplification improving linearity of the output signal and better low-frequency and high-frequency response.

Positioning the tip probe at close proximity to the sample surface while maintaining analysis capabilities is a task addressed by a variety of methods. A popular method of positioning the probe tip is by mounting the tip on the end of a soft and flexible cantilever. The cantilever bends as the probe tip senses surface forces. A laser beam is reflected off the back surface of the cantilever and onto a position sensitive detector (PSD). The PSD generates a signal indicative of the location of the laser beam spot on the detector surface. As the probe tip moves from its atomic force interaction with the sample surface, the laser beam spot moves on the PSD. The signal from the PSD is indicative of the spot movement and is used in a loop to control the tip height above the sample surface. The tip height above the sample surface can also be manually controlled.

An inherent disadvantage in using the cantilever mounting system stems from the cantilever's flexibility. When initially approaching a surface, the cantilever deflects forward as it is brought towards the sample surface. The deflection is due to the attractive atomic force interaction between probe tip and sample surface. When the interatomic force exceeds the cantilever's spring force, the cantilever end snaps in, towards the sample surface to a zero net force position with respect to the sample surface. The zero net force distance, where the probe tip and sample surface atomic forces are at near equilibrium, is a gap space of 1–3 Å between the probe tip and the sample surface. A disadvantage to this method of detection is that scanning the surface at 1–3 Å results in high friction between the sample surface and probe tip resulting in damage to both tip and sample and erroneous readings.

An inherent problem with mounting a stage on a piezoelectric tube is the extra precautions needed and associated with mounting a heavy object, like the stage, on a brittle base, like the piezoelectric tube. The forces exerted by hand or by vacuum feed through may be enough to shatter a piezo ceramic. In addition, the low Curie temperature of piezoelectric ceramics, typically 300° C., limits the temperature range over which piezo-mounted samples may be imaged. The Curie temperature refers to the temperature at which piezoelectric materials lose their permanent or spontaneous piezoelectricity. Moreover, mounting a heavy sample on the distal end of a piezoelectric scanner tube will lower its resonant frequency, thereby limiting data acquisition rates.

U.S. Pat. No. 5,321,685, to Nose et al., discloses a scanning probe microscope comprising a piezoelectric bimorph cantilever with a probe tip mounted thereon. The cantilever's position from a sample surface is controlled by a current application to the piezoelectric material. A shielding electrode for electrically isolating the probe is also provided.

U.S. Pat. No. 4,724,318, to Binnig, discloses a force sensitive probe tip mounted on a soft spring-like cantilever to interact with a sample. The cantilever and probe tip form the electrodes for a tunneling effect between the sample and the probe tip. The tunneling current is used as a correction signal for controlling the distance between the probe tip and the sample.

U.S. Pat. No. 5,210,410, to Barrett, discloses an atomic force microscope comprising a probe tip mounted on a soft cantilever for interaction with a sample mounted on a piezoelectric scanning stage. Position sensitive optics are used in conjunction with a cantilever deflection measurement circuit and control the distance between the probe tip and the sample surface.

U.S. Pat. Nos. 5,172,002 and 5,196,713, both to Marshall, disclose a scanning probe microscope. The microscope includes a probe sensing circuit for detecting interactions between a probe and a sample. The probe is connected to a probe sensing circuit and a sample is mounted on a stage. The stage is mounted on a movable end of a piezoelectric tube. Also mounted on the stage are reflective sources for a PSD. The detector is in servo connection with the piezoelectric tube for control of the X and Y directions of the stage with respect to the sample surface. A probe sensing circuit is in electrical connection with the piezoelectric tube for control of the Z direction of the stage. In this arrangement, the sample is moved with respect to a stationary probe.

U.S. Pat. No. 5,254,854, to Betzig, discloses a scanning probe microscope which includes a force sensitive probe tip movable along a scanning plane in a controllable scan pattern. The probe tip is illuminated. The deflection of the probe tip is detected by a photomultiplier tube. As the probe tip moves, the photomultiplier tube generates a signal. The probe tip position is determined from the photomultiplier tube signal. A stage mounted on a piezoelectric actuator, supports a sample. The scanning plane for the probe tip lies parallel to the sample surface being scanned. A photodetector is used to position the accompanying plane with the sample surface plane.

U.S. Pat. No. 5,128,544 to Iwatsuki discloses a scanning probe microscope such as an atomic force microscope which includes a tip, piezoelectric units for causing the tip to scan a sample in two dimensions, a power supply for operating the piezoelectric units, electrodes for applying voltages to the piezoelectric elements, and a display device providing a display of an image of the sample. The tunneling current flowing through the tip is amplified and the output current from the amplifier is held constant by means of a servo circuit. X, Y piezo actuators are wired so as to eliminate AC coupling of scan voltages to the STM tip.

U.S. Pat. No. 5,173,605 to Hayes et al. discloses a scanning probe microscope (SPM) which produces scan movement in the X, Y and Z directions by means of separate control voltages. The SPM includes a base, an inner piezoelectric tube (PZT), and an outer PZT whose first end is rigidly connected to the base. Four quadrant conductors are disposed on the outer surface of each of the inner PZT and outer PZT. A control system measures current sensed by the probe tip to indicate the distance of the probe tip from the scanned surface. The X, Y and Z voltages represent the X, Y, and Z parameters of each point of the scanned surface and the profile of the scanned surface.

U.S. Pat. No. 5,198,715 to Elings et al. discloses a scanning probe microscope which employs a piezoelectric type scanner to achieve large lateral scans. The piezoelectric tube comprises two portions. The first tube has electrodes attached thereto and is of a first piezoelectric material. The second tube is of a second piezoelectric material. The first and second tubes are attached in an end to end relationship and have equal diameters. This piezo-tube arrangement reduces non-linearity in the Z direction.

U.S. Pat. No. 5,237,859 to Elings et al. discloses an AFM using a cantilever mounted probe tip with a force sensor to detect cantilever deflection. The force sensor may comprise a PZT. Alternatively the sample may be mounted on a PZT. This design suffers from the problems associated with cantilever "snap-in" and mountings on PZTs, both as discussed above.

U.S. Pat. No. 4,851,671, to Pohl, discloses an atomic force microscope which includes a probe tip mounted on an oscillating crystal driven in the X, Y and Z directions by conventional drive means. The probe tip is held away from a sample surface. As the tip approaches the sample surface, the frequency of the oscillation of the crystal deviates, thereby providing a feedback loop control signal for the Z displacement control of the probe tip.

European Patent No. 0 383 323, to Takata et al., discloses a tunneling acoustic microscope which includes a probe tip held away from a sample surface for detecting the tunneling current flowing between the tip and sample surface. Strain waves within the sample as a result of the sample and tip interaction are detected by a piezo ceramic on which the sample is rigidly mounted. By modulating the value of the tunneling current, strain waves are generated within the sample. The waves are used to determine physical information regarding the bulk sample.

All the above referenced patents that utilize a cantilever mounted probe tip suffer from the problem of "snap-in" created when the probe tip reacts to the atomic force properties of a sample, during atomic force microscopic detection, and snaps-in towards the sample surface to a zero net force position of 1–3Å. Lateral scanning at such a small gap spacing results in high frictional forces between the tip and sample surface, further resulting in damage and loss of resolution.

Accordingly, there is a need for an AFM that maintains control over the spacing between the probe tip and the sample surface over the entire range of gap spacings.

Previous uses of PZTs have been limited to actuators in scanning tunneling microscopes and the detection of tunneling current. This invention employs PZT in both an actuating and sensing mode and allows for imaging of both insulating and conducting samples.

SUMMARY OF THE INVENTION

It is an object of the present invention to improve on the conventional techniques of atomic force microscope detection.

It is a further object of the invention to provide an atomic force microscope that detects the atomic force properties of sample surfaces for both insulators and conductors.

It is a further object of the present invention to eliminate 'snap-in' related errors and resulting probe sample damage created by conventional atomic force microscopes that utilize flexible cantilevers.

The present invention achieves these and other objects and advantages by providing an atomic force microscope having an improved rigid mounting arrangement for a probe. The probe is mounted on a transducer portion of a piezoelectric tube and positioned proximate to a sample surface. The piezoelectric tube is mounted on a rigid base. The probe generates a current signal resulting from interaction of a tip of the probe with the sample surface. Circuitry connected to the piezoelectric element amplifies the charge signal to create a feedback signal and directs the feedback signal to an actuator portion of the piezoelectric tube. A computer determines sample surface properties from the charge signal and produces an image representing the sample surface.

BRIEF DESCRIPTION OF THE DRAWING

The above and further objects and advantages of the present invention will become clear from the following description of preferred embodiments taken in connection with the following drawings, in which like reference numerals refer to like elements, and wherein.

DETAILED DESCRIPTION OF PREFERRED EMBODIMENTS

Figure 1:
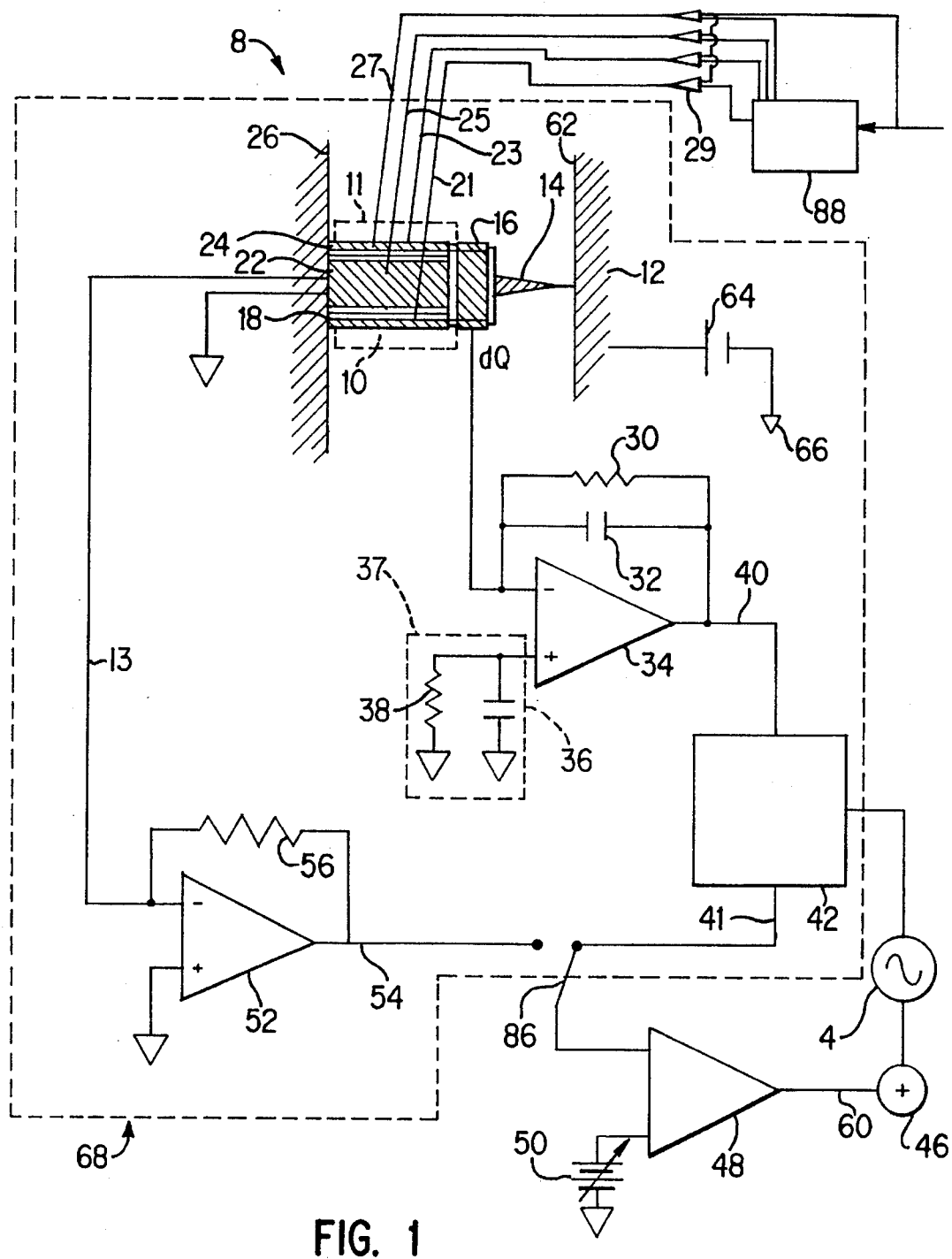
FIG. 1 depicts an atomic force microscope according to a preferred embodiment of the present invention.

FIG. 1 illustrates an atomic force microscope 8 which includes a piezoelectric element according to a preferred embodiment of the present invention. The piezoelectric element comprises a piezoelectric tube 10 having an actuator portion 11 and a transducer portion (piezoelectric detector) 16. The piezoelectric tube 10 is mounted on a rigid base 26. A probe 14 is mounted on the transducer portion 16. Probe tip displacement from the sample surface is controlled by movement of the actuator portion 11 of piezoelectric tube 10 (discussed below). The actuator portion 11 and the rigid base 26 do not deform under the atomic force interaction of the tip of probe 14 and sample surface 62. Therefore, when the probe tip is scanned proximate to the sample surface, the atomic forces that caused the probe mounted on the low-force-constant cantilever of conventional microscopes to snap into a zero net force position (discussed above) do not effect the high force constant base 26 and actuator portion 11. Thus, the problem of snap-in is obviated by the rigid base-piezoelectric tube combination. The scan range for the probe tip is controlled by the design choice of the actuator portion 11.

Probe 14 mounted on transducer portion 16 includes a sharp probe tip. The actuator portion 11 of the piezoelectric tube 10 is used to displace the probe tip from the surface 62 of sample 12 in X, Y and Z directions. The actuator portion 11 contracts and expands by application of voltage waveforms. Voltage scans are applied to sections 18, 20, 22 and 24 of the actuator portion 11. Section 24 expands in the Y and Z direction, section 22 expands in the X and Z direction, section 20 contracts in the X direction and expands in the Z direction, and section 18 contracts in the Y direction and expands in the Z direction. The Z direction refers to the horizontal displacement (left and right in FIG. 1) of the probe tip from the sample surface while the X and Y directions refer to the vertical displacement (top and bottom in FIG. 1) and perpendicular displacement (into and out of FIG. 1) of the probe tip.

Figure 2:
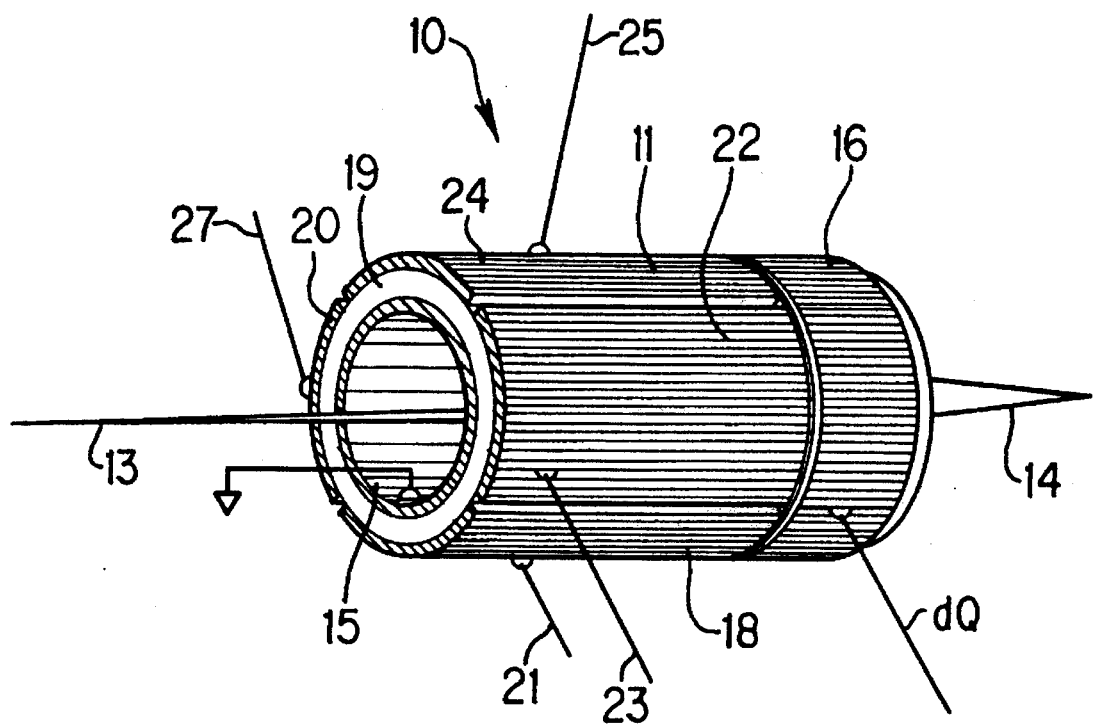
FIG. 2 depicts the piezoelectric tube 10 of FIG. 1 according to a preferred embodiment of the present invention.

FIG. 2 illustrates the piezoelectric tube 10 in greater detail than is shown in FIG. 1. The actuator portion 11 includes an inner electrode 15 which is grounded, and the sections 18, 20, 22 and 24 which are quadrature electrodes. The quadrature electrodes are separated from the inner electrode 15 by insulating piezoelectric material 19. Wires 21, 23, 25 and 27 connect the quadrature electrodes to the ampliers 29 (see FIG. 1). The transducer portion 16 is a ring electrode.

Referring to FIG. 1, the atomic force microscope 8 generates feedback from two modes of operation, a force feedback mode and a current feedback mode. In both modes, a signal indicative of probe tip—sample surface interaction is obtained and used in a feedback loop to control probe tip displacement from the sample surface. The support circuitry 68 required for each mode of operation is discussed below.

In the force feedback mode, the atomic force interaction between probe tip and sample surface 62 is detected. Interaction between the probe tip and the sample surface 62 alters the amplitude and phase of the tip vibration. The vibrations are detected by the transducer portion 16 of the piezoelectric tube 10. A change in current dQ is induced in the transducer portion 16 of piezoelectric tube 10 from the vibrations of probe tip. The change in charge dQ is fed to a charge sensitive preamplifier 34 where it is amplified and converted into a voltage.

In a preferred embodiment, the charge sensitive preamplifier 34 will typically have a gain of $10^{11}$ V/C and a cutoff frequency of 1.6 Hz, with capacitor 32 having a capacitance of 10 pF and resistor 30 having a resistance of $10^7 \Omega$. The values of the capacitors and resistors given in preferred embodiments were chosen for their ready availability. They provide a signal of 4 nV for a 10 nN force assuming a piezo-coefficient of $2 \times 10^{-2}$ Vin/N. Other values of the capacitors and resistors may be used to enhance or alter sensitivity.

A bleeding circuit 37 is attached to the positive input of charge sensitive preamplifier 34. The bleeding circuit includes a resistor 38, which will typically have the same resistance as resistor 30, and capacitor 36, which will typically have a capacitance of 10 times that of capacitor 32. The voltage output by charge sensitive preamplifier 34 is fed to lock-in amplifier 42. In force feedback mode, switch 86 is positioned towards the right in FIG. 1. Lock-in amplifier 42 amplifies the voltage output by preamplifier 34 at the reference frequency and is summed by summing amplifier 46 with a modulated voltage from voltage source 4 to produce a feedback signal which is fed by line 60 to computer 88 and also summed into the z drive of piezo actuator 11. Modulated voltage source 4 may be a standard wave generator. A user may modify the signal by varying set point 50. Thus, the voltage output by the preamplifier 34 is used in a feedback loop to control the displacement of probe tip from sample surface 62 under constant force conditions. Computer 88, includes a conventional monitor. Both computer 88 and the conventional monitor are used to image various signals produced by the atomic force microscope, such as the voltage output by preamplifier 34 and the tip displacement produced by the transducer portion 16. Imaging techniques, which are known to those of ordinary skill in the art, are used to produce images of the sample surface or sample surface properties.

In current feedback mode, switch 86 is positioned to the left as shown in FIG. 1. As shown in FIG. 1, a known voltage is applied to sample 12 by source 64. The voltage induces a tunneling current in the probe tip when the tip is positioned proximate to the sample surface. The tunneling current is fed along line 13 to current-to-voltage converter 52. Current-to-voltage converter 52 will typically have a gain of $10^7$–$10^9$ V/A, with resistor 56 having a resistance of $10^7$–$10^9 \Omega$ as a typical value. The current-to-voltage configuration disclosed above is a preferred embodiment. However, other realizations of the current-to-voltage converter may be used. A voltage output on line 54 from current-to-voltage converter 52 passes through switch 86 to amplifier 48. Because current amplifier 48 is a DC coupled device, modulated voltage source 4 does not need to be summed with feedback signal 60. Set point 50 and computer 88 are used to modify the feedback signal 60 so as to accommodate user input. The feedback signal is then fed to sections 18, 20, 22 and 24 of the actuator portion 11 to control probe tip displacement normal to the sample surface 62. Computer 88 images properties of the sample surface or a representation of the sample surface from voltage output from current-to-voltage converter 52, or the feedback signal output from amplifier 48.

In current feedback mode, the transducer portion 16 is not in use and the instrument is operating as a conventional STM. Although the piezoelectric properties of the transducer portion 16 are actively producing a change in current dQ from the interaction of the probe tip and sample surface, current dQ is not needed and switch 86 is positioned to the left as shown in FIG. 1.

Figure 3:
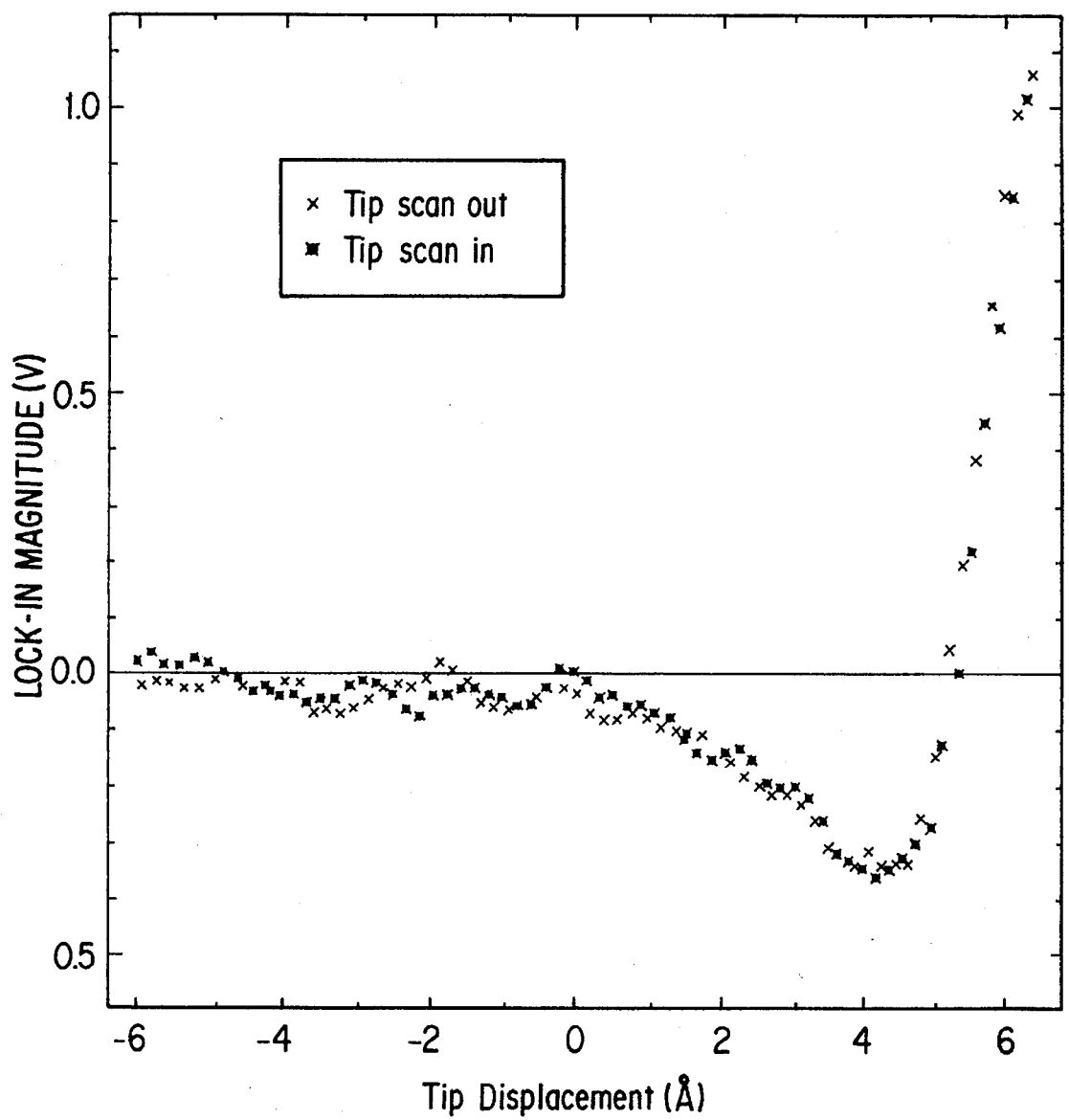
FIG. 3 is a graph of lock-in voltage magnitude versus tip displacement magnitude for the atomic force microscope of the present invention.

A graphical representation of force gradient data throughout a range of probe tip sample separations between a gold surface and a tungsten probe tip according to a preferred embodiment of the present invention is shown in FIG. 3. The X's indicate a voltage magnitude as the tip is displaced from a position close to the sample surface to a distant position from the sample surface. The *'s indicate voltage magnitudes of tip displacement scanning from a position distant from the sample surface to a position close to a sample surface. It would be impossible to obtain such a range of force gradient data throughout the given range of probe tip-sample separations using a conventional AFM with soft cantilever because probe tip-sample separation cannot be precisely controlled due to the "snap-in" effect.

Figure 4A:
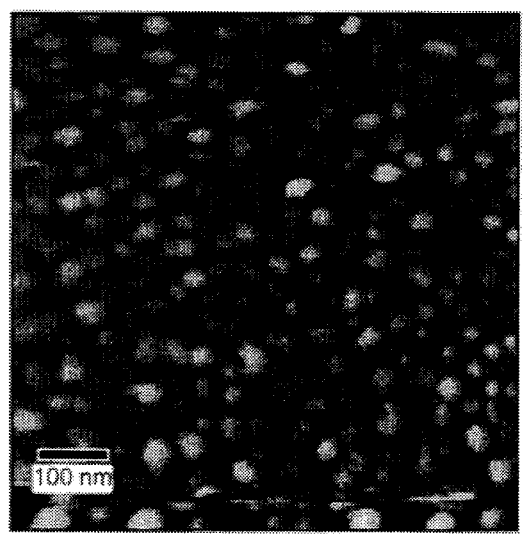
FIGS. 4A and 4B depict height-mapped grey scale topographs obtained using conventional scanning tunneling microscope.
Figure 4B:
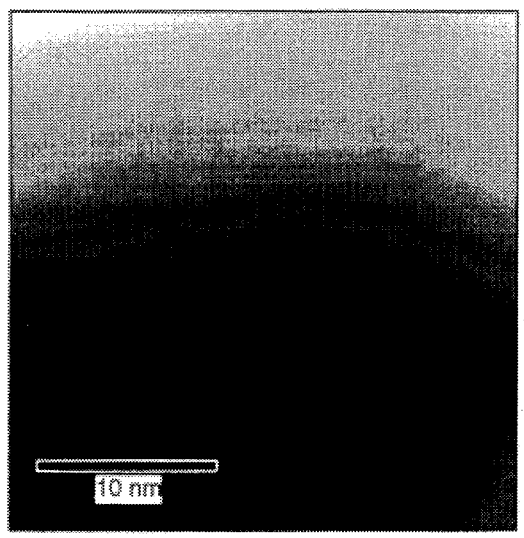
Figure 4C:
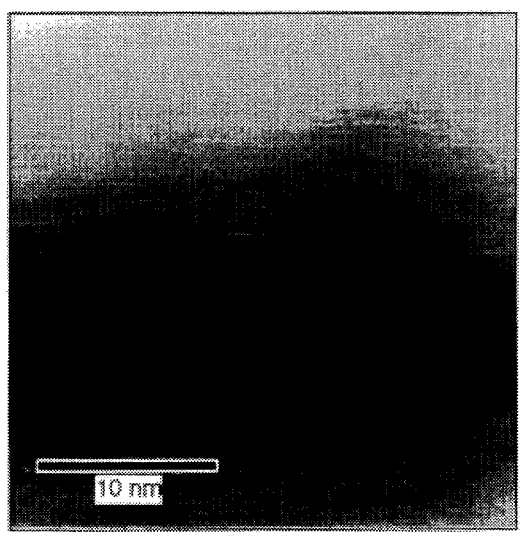
FIG. 4C depicts a height-mapped grey scale topograph of the same area depicted in FIG. 4B using an atomic force microscope according to a preferred embodiment of the present invention.

FIGS. 4A, 4B and 4C are height-mapped grey scale topographs depicting a thin film of gold on silicon sample using a probe tip of etched tungsten. FIG. 4A depicts a large-area scan of the gold on silicon sample using a conventional STM. FIG. 4B depicts a small-area scan of the gold on silicon sample using a conventional STM. FIG. 4C is a height-mapped grey scale topograph generated by the AFM of the present invention. FIG. 4C depicts the same small scan area of the gold on silicon sample as shown in FIG. 4B and demonstrates the feasibility of the present invention.

While this invention has been described in conjunction with specific embodiments it is evident that many alternatives, modifications and variations will be apparent to those skilled in the art. Accordingly, the preferred embodiments of this invention, as set forth herein, are intended to be illustrative, not limiting. Various changes may be made without departing from the spirit and scope of the invention as defined in the following claims.

I claim:

1. An atomic force microscope for determining properties of a sample surface, comprising:

a piezoelectric element mounted on a rigid surface, the piezoelectric element comprising at least one actuator portion and at least one piezoelectric detector portion;

a probe having a tip, the probe mounted on the piezoelectric element, the probe generating a charge signal resulting from interaction of the tip with the sample surface;

circuitry connected to the piezoelectric element, the circuitry amplifying the charge signal to create a feedback signal and directing the feedback signal to the at least one actuator portion; and analyzing means connected to the circuitry, the analyzing means for determining sample surface properties from the feedback signal.

2. The atomic force microscope according to claim 1, further comprising an imaging device connected to the circuitry that generates an image representative of a sample surface property.

3. The atomic force microscope according to claim 1, wherein the at least one actuator portion expands and contracts in response to the feedback signal.

4. The atomic force microscope according to claim 3, wherein the at least one actuator portion positions the probe tip proximate to the sample surface.

5. The atomic force microscope according to claim 1, wherein the circuitry includes a current feedback portion and a force feedback portion of the circuitry, further comprising a switch device that selects one of the current feedback portion and the force feedback portion.

6. The atomic force microscope according to claim 5, wherein the probe is mounted on the at least one piezoelectric detector portion and positioned proximate to the sample surface, the tip moving in response to atomic force reaction with the sample surface, the piezoelectric detector portion generating a detector signal in response to movement of the tip, the force feedback portion comprising:

a charge sensitive pre-amplifier receiving and amplifying the detector signal and generating a first signal in response to the amplified detector signal;

a lock-in amplifier receiving and amplifying the first signal and generating a second signal in response to the amplified first signal;

an amplifier that amplifies a difference between the second signal and a third signal input through a manual set point connected to the amplifier, the amplifier generating a fourth signal in response to the second signal and the third signal;

summing means for summing the fourth signal with an a.c. coupled oscillating voltage signal to generate a fifth signal, wherein the analyzing means is connected between the summing means and the at least one actuator portion, the at least one actuator portion moving in response to the feedback signal to position the tip relative to the sample surface.

7. The atomic force microscope according to claim 6, wherein the charge sensitive pre-amplifier further comprises:

a feedback loop connected to an inverting input and an output charge sensitive pre-amplifier; and a bleeding circuit connected to a non-inverting input of the charge sensitive pre-amplifier.

8. The atomic force microscope according to claim 7, wherein the feedback loop comprises at least one resistor and at least one capacitor connected in parallel between the output and the inverting input of the charge sensitive pre-amplifier.

9. The atomic force microscope according to claim 8, wherein the bleeding circuit comprises a grounded capacitor and a grounded resistor connected in parallel to the non-inverting input of the charge sensitive pre-amplifier.

10. The atomic force microscope according to claim 9, wherein the grounded resistor within the bleeding circuit has a resistance equal to a resistance of the resistor within the feedback loop.

11. The atomic force microscope according to claim 10, wherein the grounded capacitor within the bleeding circuit has a capacitance at least ten times greater than a capacitance of the capacitor within the feedback loop.

12. The atomic force microscope according to claim 11, wherein the charge sensitive preamplifier has a gain of approximately $10^{11}$ V/C and a cutoff frequency of approximately 1.6 Hz.

13. The atomic force microscope according to claim 5, wherein the probe is positioned proximate to the sample surface, the probe generating a tunneling current in response to interaction of the tip with the sample surface, the current feedback portion comprising:

a power source connected to the sample surface, the power source inducing a charge within the sample surface;

a current-to-voltage converter receiving and converting the tunneling current into a voltage signal;

an amplifier device that amplifies a difference between the voltage signal and a first signal input through a manual set point connected to the amplifier, the amplifier generating a second signal in response to the voltage signal and the first signal;

a modulating voltage source generating a third signal;

a summing device that sums the second signal and the third signal to generate a fourth signal, wherein the analyzing means is connected to the at least one actuator portion moving in response to the feedback signal to position the probe tip relative to the sample surface.

14. The atomic force microscope according to claim 1, wherein the determined properties of the sample surface include at least one of topology, normal force, drag force, magnetic domain structure and electron density.

15. The atomic force microscope according to claim 1, wherein the piezoelectric element comprises a piezoelectric tube.

16. The atomic force microscope according to claim 1, wherein the analyzing means comprises a computer.

17. A method for determining properties of a sample surface using an atomic force microscope comprising the steps of:

mounting a piezoelectric element on a rigid base surface, the piezoelectric element having at least one actuator portion connected with at least one piezoelectric detector portion;

mounting a probe having a tip on the piezoelectric element;

positioning the tip proximate to the sample surface using the at least one actuator portion;

generating a charge signal based on an interaction between the tip and the sample surface;

amplifying the charge signal to create a feedback signal; and determining properties of the sample surface based on analysis of the feedback signal.

18. The method according to claim 17, further comprising the step of generating an image of the sample surface based on the feedback signal.

19. The method according to claim 18, further comprising the steps of:

inducing a charge within the sample surface;

mounting the probe on the piezoelectric detector portion proximate to the sample surface;

generating a tunneling current within the probe in response to interaction of the tip with the sample surface;

directing the tunneling current to a current-to-voltage converter, the current-to-voltage converter converting the tunneling current into a voltage signal;

connecting a switch device to the at least one current-to-voltage converter and at least one charge amplifier, the switch device effecting an electrical connection between the current-to-voltage converter and the at least one amplifier, the at least one amplifier amplifying a difference between the voltage signal and a first signal input through a manual set point connected to the amplifier, the amplifier generating a second signal in response to the voltage signal and the first signal;

summing the second signal and a third signal generated by a modulating voltage source to generate a fourth signal;

moving the at least one actuator portion in response to the feedback signal to position the probe tip relative to the sample surface.

20. The method according to claim 17, further comprising the step of generating a detector signal in response to movement of the tip.

21. The method according to claim 20, further comprising the steps of:

directing the detector signal to a charge sensitive pre-amplifier, the charge sensitive pre-amplifier amplifying the transducer signal and generating a first signal in response to the transducer signal;

directing the first signal to a lock-in amplifier, the lock-in amplifier amplifying the first signal and generating a second signal in response to the first signal;

directing the second signal to an amplifier, the amplifier amplifying a difference between the second signal and a third signal input through a manual set point connected to the amplifier, the amplifier generating a fourth signal in response to the second signal and the third signal;

summing the fourth signal and an a.c. coupled oscillating voltage signal to generate a fifth signal; and moving the at least one actuator portion in response to the feedback signal to position the piezoelectric detector portion relative to the sample surface.

22. The method according to claim 21, further comprising the step of providing a gain of approximately $10^{11}$ V/C and a cutoff frequency of approximately 1.6 Hz to the charge sensitive preamplifier.

23. The method according to claim 17, further comprising the step of selecting one of a force feedback portion and a current feedback portion.

24. The method according to claim 17, wherein the piezoelectric element comprises a piezoelectric tube.

25. The method according to claim 17, wherein the step of determining properties of the sample surface includes the step of determining the properties by computer analysis of the feedback signal.

26. The method according to claim 17, wherein the step of determining properties of the sample surface comprises the step of determining at least one of topology, normal force, drag force, magnetic domain structure and electron density of the sample surface.

* * * * *